United States Patent [19]
Hahn

[11] 3,742,216
[45] June 26, 1973

[54] NUCLEONIC GAUGE FOR MEASURING PROPERTIES OF THIN MATERIALS

[75] Inventor: Linus K. Hahn, Columbus, Ohio

[73] Assignee: Industrial Nucleonics Corporation, Columbus, Ohio

[22] Filed: Nov. 17, 1969

[21] Appl. No.: 877,166

[52] U.S. Cl............ 250/83.3 D, 250/105, 250/106 S
[51] Int. Cl......................... G01n 23/16, G21f 5/02
[58] Field of Search...................... 250/83.3 D, 105, 250/106 S

[56] References Cited
UNITED STATES PATENTS

| | | | |
|---|---|---|---|
| 3,253,149 | 5/1966 | Wilson............................ | 250/83.3 D |
| 3,094,622 | 6/1963 | Handel........................... | 250/83.3 D |
| 3,148,278 | 9/1964 | Shonborn et al. ............. | 250/83.3 D |
| 3,210,541 | 10/1965 | Cropper et al. ............. | 250/106 S X |
| 3,426,200 | 2/1969 | Lehman et al................. | 250/83.3 D |

*Primary Examiner*—Archie R. Borchelt
*Attorney*—Marechal, Biebel, French and Bugg, William T. Fryer, III and C. Henry Peterson

[57] ABSTRACT

A nucleonic gauge for measuring thin materials such as paper tissue, plastic film or the like has a source head with an annular cavity containing Krypton 85 and a beta energy shifting or softening target. The softened reflected beta rays are directed through a centrally positioned aperture and the extent of interaction by the material under measurement in the pass gap is measured by a detector head. The source includes a shutter which forms a portion of the target material in the retracted position of the shutter. The shutter is axially movable into an aperture closing position. The target material is removable and interchangeable for selecting the desired degree of beta softening. Good sensitivity is maintained by reducing the air column in the head and in the detector, and by maintaining a temperature of both heads at substantially that of the material being measured.

10 Claims, 7 Drawing Figures

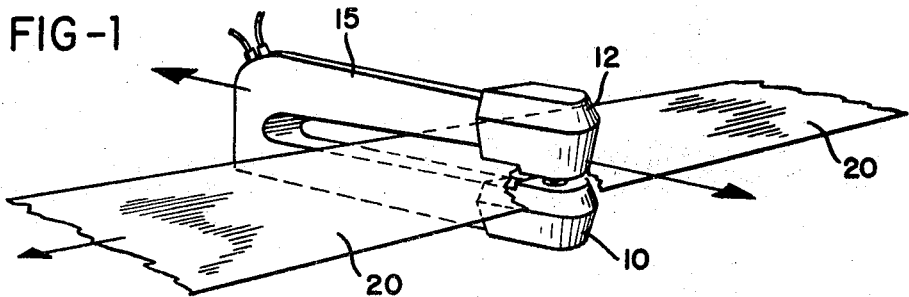
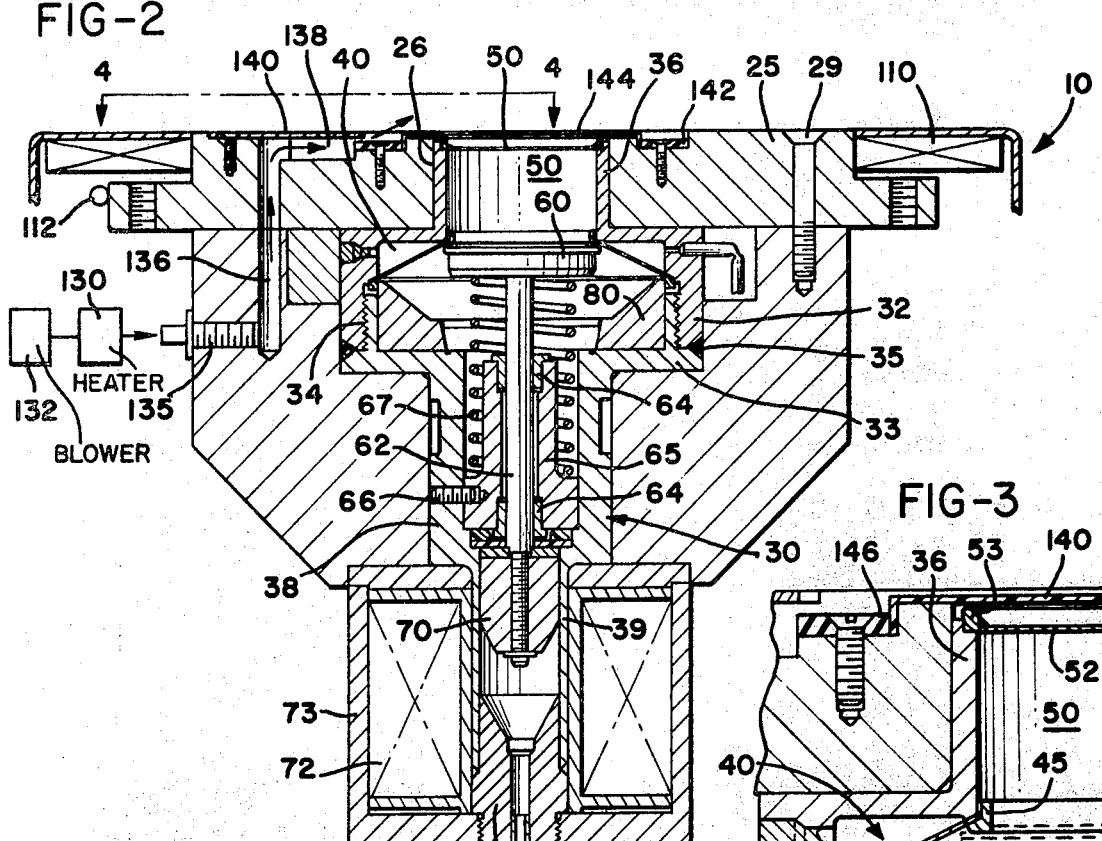
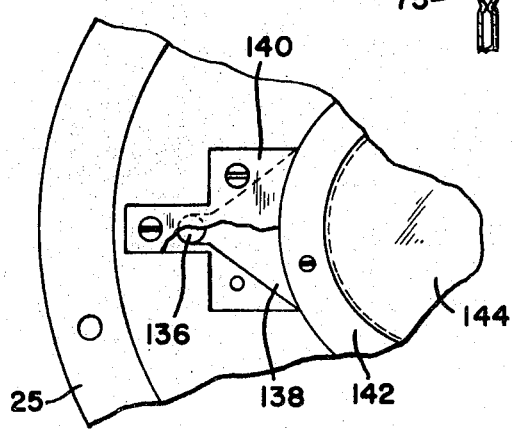
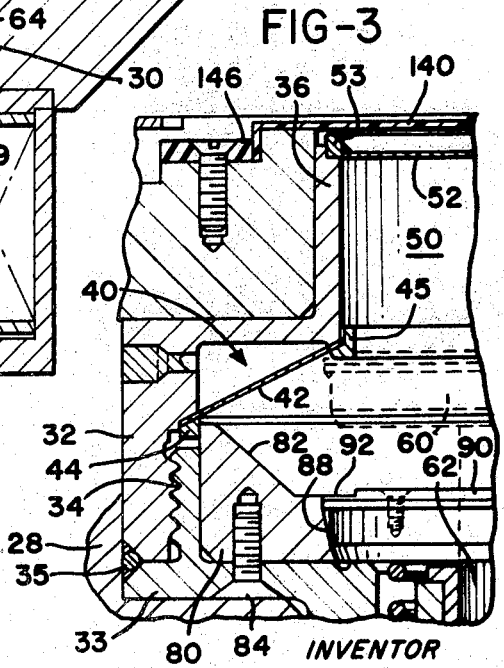

NUCLEONIC GAUGE FOR MEASURING PROPERTIES OF THIN MATERIALS

BACKGROUND OF THE INVENTION

Radioactive measuring instruments of both the transmission and back scatter type have come into wide use for measuring mass, basis weight and/or thickness of web materials during the formation or coating of such materials, such as shown, for example, in U.S. Pat. Nos. 25,353, 3,087,061 and 3,240,939. While systems of this general type have been quite successful and satisfactory, they are limited in their ability accurately to measure low mass materials, such as paper tissue, thin plastic film, and the like, where the presence or the absence of such material in the pass gap has a minimal effect on the radiation energy detected by the sensing or detecting head. Often, variations in the air column between the sending and detecting unit, such as variations in the mass of air caused by variations in the spacing of the heads, the temperature or humidity of the air, may equal or exceed those variations which are attributed to the presence of such thin or lightweight material. These and other factors have effectively limited the response of many commercially available and otherwise acceptable nucleonic measuring devices to a lower range of approximately 18–20 pounds per ream (3,000 sq. feet). Since typical thin tissue paper weighs as little as seven pounds per ream, it is clear that much of the prior geometry which has been used successfully for heavier materials is not satisfactory for the measurement of tissue.

It is known that the problem can be resolved essentially by the use of radiations that are more easily attenuated by a given basis weight of the paper, and also by the use of a suitable detector. Attempts have been made to measure thin tissue papers with an alpha source such as Ra-266 and a soft beta source such as C-14 and Pm-147, with varying degrees of success.

Each of these three sources contains some serious and inherent limitations. One is the difficulty of obtaining a useful effective source strength out of a given source material due to the significant self-absorption within it and to the absorption in the source encapsulation. The very advantage of "soft" radiations found in these sources turns out to limit their practical usefulness.

To make up for the loss by the self-absorption and attenuation by the encapsulation, the source must be increased both in physical dimensions and activity. Often, an increase in physical dimensions requires such practical considerations as the measured area of material, the source fabrication and stability, and others. An increase in source strength is limited sometimes by the cost of isotopes.

In addition to these limitations, performance generally required of on-line measurement systems renders the practical use of these sources still more difficult. Fast response time and high accuracy generally associated with the on-line measurements necessitate a larger effective source strength coupled with high detection efficiency and stability.

SUMMARY OF THE INVENTION

The present invention is directed to an improved nucleonic measuring gauge which is particularly adapted for the measurement of thin or lightweight materials such as tissue, thin plastics and the like. The gauge of this invention makes use of reflected beta energy.

When beta rays from a source are reflected from a target, the average energy and also the maximum energy of the beta rays are reduced in some manner according to the atomic number of the target. Thus, for instance, the absorption in a given material of Pb-reflected beta rays is greater than that of the primary direct beta rays and, likewise, the absorption of brass-reflected beta rays is greater than that of the Pb-reflected beta rays, and so forth. In other words, beta rays can be arbitrarily made "softer" than the primary rays by a suitable reflection (or scattering) method.

The "extrapolated" maximum energy of beta rays reflected from a target Z of infinite thickness is given by an empirical relation $$E_{max}^{ref} = 0.12 \ Z^{0.38} \ E_{max_0}^{inc}$$

For Kr-85 with $E_{max}^{inc} = 0.695$ Mev, it is found that $E_{max}^{ref}$ is 0.221 Mev with Al reflector. Unlike the beta rays from isotopes, the reflected beta rays do not have any "allowed" shape in energy distribution. In fact, it may be said that the spectrum of beta rays reflected from any given target has no meaningful correlation to a given original spectrum distribution.

The present invention accordingly employs a source of radioactive energy comprising Krypton 85. This material forms a practical source as against radioactive powders and the like as, since it is a gas, it is uniformly distributed throughout the remaining cavity and is therefore non-shifting in character. Further, Kr-85 is a relatively high active source and may therefore be contained within a reasonably small cavity. Since it is an inert gas, in the event of an industrial accident causing the source to be ruptured, it readily diffuses into the air and becomes completely harmless.

The beta rays emitted from the source are reflected from a suitable target material, which material can be selected to achieve the desired shifting of the spectrum to a lower energy level. Examples of such target material include brass and aluminum.

The source is arranged annularly within a source housing and is positioned so as to emit rays generally inwardly onto the target material for reflection through an axially positioned aperture or window. A shutter has an exposed surface forming a portion of the target material and is movable from a retracted or recessed position when the gauge is in use to an extended or forward position in closing relation to the aperture. The target material, including that carried by the shutter, is removable to provide for an initial selection of the desired material or a combination of two or more materials to obtain a desired softening of the beta energy. The shutter is preferably operated externally of the housing by a magnetic solenoid actuator and is spring biased to move into the closed position upon the disruption of electric energy to the solenoid.

The interior of the source housing is preferably evacuated, as is the interior of the detector collimator, for the purpose of reducing variations and changes which would be due to the presence of an air column. Further, temperature compensation is provided by heater means associated with the detector and source heads together with a control circuit for maintaining the temperature of each of these heads substantially equal to each other and to the temperature being measured. An air discharge orifice is provided at the pass gap and is arranged to direct a washing stream of heated air over the source window for the purpose of preventing an accumulation of dust on the window. This air is normally heated to a predetermined temperature substantially corresponding to that of the heads and the material under test. The air blowing arrangement may also be employed for the purpose of cooling the heads more rapidly when a change in head temperature is required, as would occur when the material being tested is changed.

As noted, the detector preferably employs a collimator leading into an ion chamber, although it is within the scope of this invention to utilize other detecting techniques such as a plastic phosphor for exciting a photomultiplier tube. When a collimator is used, it is preferably also evacuated to eliminate the portion of the air column represented thereby.

BRIEF DESCRIPTION OF THE DRAWINGS

FIG. 1 is a perspective view showing a typical embodiment of the present invention;

FIG. 2 is a vertical section through the source head;

FIG. 3 is an enlarged fragmentary vertical section similar to FIG. 2 showing the shutter in the opened position;

FIG. 4 is a fragmentary plan view looking generally along the line 4—4 of FIG. 2 with a portion broken away to expose the dust blower orifice;

DESCRIPTION OF PREFERRED EMBODIMENT

Figure 6:
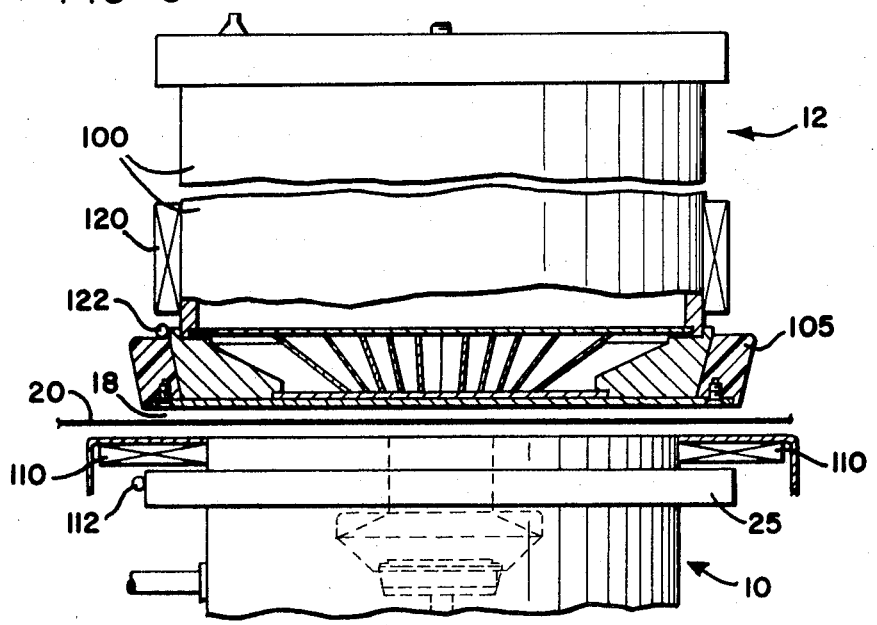
FIG. 6 is a partially broken away end view showing the relationship of the source and detector heads.

Referring to FIG. 1 a typical tissue or thin film gauge constructed according to this invention is shown as including a source head 10 and a detector head 12 mounted on the ends of a C-bracket support 15 in vertically spaced apart relation defining a pass gap 18 (FIG. 6) therebetween. The support 15 is mounted on guideways (not shown) for movement in a direction transverse to that of a web 20 of tissue, the thickness or basis weight of which is to be measured by the present invention. The structural support and arrangement of the source and detectors of this invention and the provision for traversing movement to obtain profile measurements may be accomplished, for example, in the manner shown in U.S. Pat. Nos. 3,006,225 and 3,108,844 which show C-bracket nucleonic gauges. Further, it is within the scope of this invention to employ any suitable means for mounting the source and detector in spaced relation. For example, these may be mounted, in a suitable installation, on stationary supports or may be mounted for traversing movement on an O-bracket frame as shown, for example, in U.S. Pat. No. D183,213. For a high degree of accuracy of measurement it is important, however, that the relationship of the source head and the detector head be maintained with good consistency throughout the traversing scan in order that the geometry of the pass gap 18 be maintained as a constant or that the variations in mass of the air in the gap be negligible as compared to the variations in basis weight of the web 20.

Reference may be had to FIGS. 2 and 3 for details of the source head 10, in which the protective cover has been omitted for the purpose of clarity. The source head 10 thus includes an upper housing support and cover plate 25 which also forms a portion of the source shield. The plate 25 is formed in a generally annular shape and accordingly defines a central opening 26. Depending from the cover 25 is a main source shield and housing 28 which is similarly formed with an enlarged central cavity to receive a source and shutter housing assembly 30. The housing 28 is supported from the plate 25 by a series of machine screws 29.

The assembly 30 is formed, for the convenience of assembly, in an upper housing 32 and a lower housing 33 which are threaded together at 34 and annularly welded at 35 after assembly. The upper housing 32 has a reduced neck portion 36 which extends axially through the opening 26 in the cover plate 25. The lower housing 33 has a lower portion 38 of reduced diameter received within the housing 28 and a continuing lower extension or extremity 39 which extends below the housing 28.

The assembly 30 forms the means in the source head 10 for containing a source of beta energy. For this purpose, the upper housing 32 is formed with an annular cavity indicated generally at 40. A cavity 40 is closed by a sloping annular stainless steel window 42. The window is supported in sealed relation to the upper housing 32 by means of a pair of rings 44 and 45 (FIG. 3) which are silver soldered to the housing 32. The cavity 40 defines a space for receiving a source of beta energy, and in the preferred embodiment this source material comprises the inert gas Krypton 85 which may be inserted within the space 40 and sealed under a positive pressure, such as two atmospheric pressure, for example.

The upper portion of the housing 32 extending axially through the plate 25 forms a radiation aperture 50, and the cavity 40 is arranged in circumferential relation with respect to the aperture 50. The annular stainless steel window 42 is arranged at an angle to direct beta energy generally inwardly into the body defined by the upper and lower source housings and away from the aperture 50, so that the beta rays are not emitted directly from the source 40 through the aperture 50.

The aperture 50 is closed adjacent its upper extremity by a thin mica window 52 and is hermetically sealed to the cylindrical portion 36 by a ring 53. Preferably, the mica window is glass bonded to the ring 53 to form an air tight seal with the upper housing 32.

The source housing of this invention further includes shutter means which is movable from a retracted position in which the aperture 50 is effectively open to a closed position, as shown in full lines in FIG. 2, in which beta energy is effectively blocked from escaping through the aperture. The shutter means of this invention comprises a head 60 and an attached plunger or rod 62. The head 60 is formed of high density material, such as tungsten, and is received in the interior of the shutter assembly 30. The rod 62 is mounted for guiding movement on a pair of bronze bushings 64 received within a tubular guide 65. The latter being keyed within the lower portion 38 of the housing 32 by a set screw 66. A coiled compression spring 67 is received over the rod 62 between the head 60 and a ledge on the guide 65 for urging the shutter into the closed position with the aperture 50, as shown in FIG. 2.

The lower end of the rod 62 supports a soft iron armature 70 which is received for sliding movement within the cylinder portion 39. Means for effecting a retracted movement of the shutter mechanism within the source housing comprises an electric solenoid coil 72 mounted within a coil housing 73 and received over the outside of the depending cylindrical portion 39. The lower end of the portion 39 is closed by a combined armature stop and seal 75 through which the inner cavities of the source and shutter housing assembly 30 may be evacuated and sealed.

The source housing of this invention operates on the principle of beta energy softening by reason of the impingement of the beta rays from the source 40 onto suitable target material, which material also forms a reflector for redirecting the softened beta energy through the aperture 50 and the mica window 52 into the region of the pass gap. The target material includes an annular insert 80 received within the enlarged upper portion of the housing 33 and having a generally upwardly facing frustoconical surface 82. The insert 80 is retained by screws 84 and may be formed of any suitable known beta softening material to achieve energy shifting in accordance with its atomic weight with specific examples being brass and aluminum. The insert 80 has axial aperture 88 into which the shutter head 60 moves in its retracted position. In this position, the upper surface of the shutter forms, in effect, a relatively unbroken continuation of a reflector surface 82. The upper portion of the head 60 includes a removable plate 90. The open surface 92 in effect forms a continuation of the surface 82, and is formed of target material. This material may be the same as that of the insert 80 or may be selected from a different material, for the purpose of achieving a desired range or degree of beta softening. For example, the insert 80 may be formed of aluminum while the plate 90 may be brass. Accordingly, in the retracted position of the shutter, the emitted beta energy from the source cavity 40 impinges upon the target surfaces 82 and 92 where a portion is redirected outwardly through the aperture 50.

Figure 5:
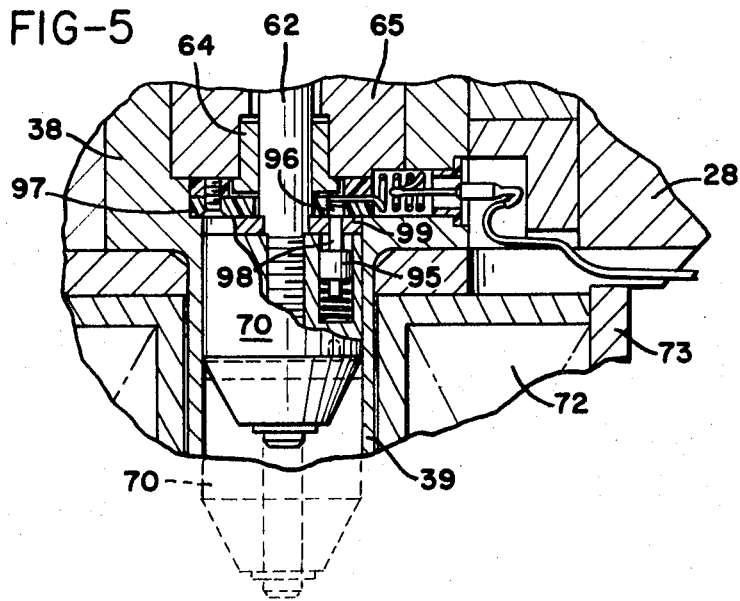
FIG. 5 is an enlarged vertical section through the lower portion of the source head showing the electrical contacter arrangement.

The details shown in FIG. 5 illustrate a preferred arrangement for providing an electric signal of the fact that the shutter mechanism is in the closed position. For that purpose, the armature 70 may contain a plunger 95 and one or more electrical contact 96 may be received within a phenolic block 97 within the housing portion 38. The plunger 95 has an upper actuating extremity 98 operating through a keeper washer 99 to come into electrical contact with the contact 96 upon the deenergization of the coil 72 to provide a positive indication that the shutter is closed.

The detector head 12 preferably includes an ion chamber 100 which may be constructed according to U.S. Pat. No. 3,396,275, and is shown somewhat diagrammatically in FIG. 6. Preferably, the chamber 100 is mounted on a collimator 105 which may be constructed according to U.S. Pat. No. 3,373,286. For the purpose of eliminating variations due to mass changes in the air column, the interior of the collimator may be evacuated and sealed. Accordingly, the only portion of the structure which remains subject to air gap variations is that defined by the pass gap itself. The employment of a sub-atmospheric pressure or a vacuum within the collimator as well as within the source housing provides a constant stress condition on the respective windows of the collimator and the source housing with the result that the geometries thereof remain constant over an extended period of use.

Temperature compensation for causing the gauge of the present invention to be relatively insensitive to temperature variations is accomplished by heating the source and detector heads to a common temperature in excess of ambient temperature and controlling this temperature substantially at that of the on-line temperature of the web 20. For this purpose, an annular plate heater 110 may be received adjacent the cover plate 25 in surrounding relation thereto, and the temperature thereof monitored by a thermistor 112. The detector head may, in turn, be provided with an annular band heater 120 and its temperature monitored by a thermistor 122, as diagrammatically shown in FIG. 6.

Further means for controlling and stabilizing the temperature comprises a constant temperature heater 130 connected to the output of a blower 132 and connected to apply air to a conduit 135 formed within the housing and shield 28. The conduit 135 is connected with a corresponding conduit 136 formed in the cover plate 25 and exits adjacent the aperture 50 in a generally fan-shaped opening 138, as shown in FIG. 4. A cover shoe 140 covers the opening 138 and directs air across the window to prevent the accumulation of dust. If desired, a plastic overlay sheet 144 may be retained by an annular retainer 142 on the upper surface of the plate 25 over the mica window 52 for the purpose of providing mechanical protection for the window itself and for sealing it against the entrapment of dust particles. The operating temperature of the heater 130 is maintained at a value corresponding generally to that of the respective housings and to the web 20. When it is desired to change the set-up and thus cool the source and detector heads, the blower 132 may be operated with the heater 130 turned off to cause a more rapid cooling of these parts.

Figure 7:
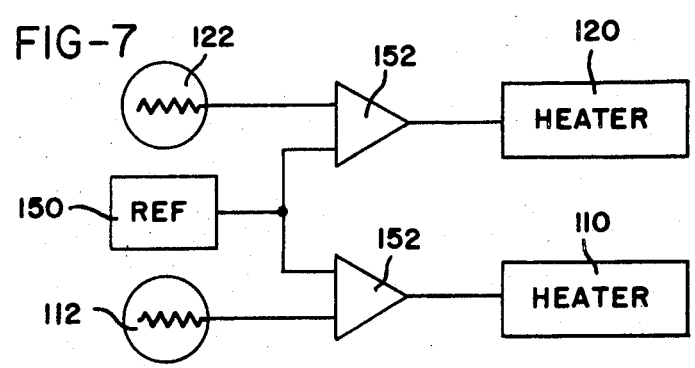
FIG. 7 is a block diagram of a suitable temperature control circuit for use with this invention.

A typical circuit for controlling the operation of the heaters 110 and 120 is illustrated diagrammatically in FIG. 7. A common reference 150 provides means for setting in a signal representative of a predetermined temperature, corresponding generally to the known temperature of the web 20. This signal is supplied to the input of separate comparative amplifiers 152 which, in turn, may include a suitable thyristor control circuit for applying power to the heaters 110 and 120. In this manner, the actual temperature of the source 10 and the detector 12 are maintained relatively equal to each other and equal to the web temperature.

The operation of the foregoing invention is primarily self-evident from the foregoing description. The known temperature of the material to be measured is sent in to the reference 150 and the unit allowed to stabilize in temperature. The temperature stabilization is enhanced by the operation of the blower 132 and heater 130, as described. Further, it is within the scope of this invention to control the heater 130 similarly to the manner shown in controlling the heaters 110 and 120, but it has been found that the blower heater can be chosen so as closely to approximate the known temperature conditions with satisfactory results.

The application of electric power to the solenoid 72 causes the shutter head 60 to be retracted by reason of the armature 70 being pulled downwardly into the center of the solenoid. In the retracted position, the head 60 is seated on the lower housing portion 32 with its upper surface 92 forming, in effect, a continuation of the target surface 82.

The beta rays emitted from the source 40 cannot escape directly through the aperture 50 but are reflected from the target material 80 and 90, through the mica window, where a portion of the softened portion of the beta rays are scattered and absorbed by the material 20. The remaining rays which are not so attenuated are collimated and detected in the detector head 12, and the portion of the rays that are attenuated are measured as an indication of the mass of the material 20. Such a signal may, accordingly, be used to indicate the thickness of the material. The present invention permits measurement of low mass materials by reason of the employment of softened beta rays as well as the limination of much of the air column which separates the source from the detector. In addition, maintenance of the source and detector substantially at on-line web temperature reduces variations in signal output which would otherwise be due to temperature variations within the parts.

In shutting down the gauge, power to the coil 72 is removed. This permits the head 60 of the shutter to be moved by the spring 67 to its closed position, as shown by the broken lines in FIG. 3 and by the full lines in FIG. 2. The top of the shutter is urged into sealing and aperture closing engagement with the bottom surface of the ring 45, and the high density material of the head effectively blocks radiation through the aperture 50. The shutter will automatically be closed in the event of a fire or other industrial accident which causes loss of electric power to the coil 72.

While the form of apparatus herein described constitutes a preferred embodiment of the invention, it is to be understood that the invention is not limited to this precise form of apparatus, and that changes may be made therein without departing from the scope of the invention.

What is claimed is:

1. A nucleonic beta gauge for measuring basis weight of mass material, such as paper tissue, plastic film and the like, comprising a source head adapted to be positioned at one side of the material to be measured, a detector head adapted to be positioned at an opposite side of said source head defining a pass gap therebetween through which a quantity of such material may be positioned or moved, said source head having a body, a source of beta energy in said body having means defining a window through which beta energy exits from said source, means in said head forming a target positioned to receive a major portion of energy from said window and being formed of a material effective to modify the energy emitted by softening such energy, means on said body defining an aperture at said pass gap positioned to receive said modified beta energy from said target for application to material in said gap, and at least a portion of said target forming means being movable into closing relation to said aperture.

2. The gauge of claim 1 in which said body includes means defining an annular cavity containing said source material and in which said window is annularly related to said cavity.

3. The gauge of claim 1 further comprising heater means associated with said source head and with said detector head, temperature sensing means in each said head, and control means connected to said sensing means and connected to control said heater means for maintaining the temperature of each of said heads substantially constant and substantially at the same temperature as that of said material.

4. A nucleonic beta gauge for measuring the basis weight of thin or low mass materials such as paper tissue, plastic film and the like including a source of beta energy and a detector positioned respectively at opposite sides of said material and defining a pass gap therebetween, the improvement in source geometry comprising a source housing body having a cavity therein including an aperture opening at said pass gap, a confined source of beta energy received in said body cavity in circumferential relation with respect to said aperture and having an annular window positioned to direct beta energy therefrom generally inwardly into said body and away from said aperture, and means in said body forming reflector target material positioned to receive said energy from said source and to redirect softened beta energy toward said aperture for exit therethrough and interaction with said low mass material.

5. The gauge of claim 4 in which said source is radioactive Krypton gas.

6. The gauge of claim 4 further comprising a shutter comprising at least a portion of said target material and movable between a retracted position in which said target material portion is positioned to receive and reflect beta energy toward said aperture and an extended position in which said shutter is effectively in beta closing relation to said aperture.

7. The apparatus of claim 6 in which said shutter further comprises a plunger member having an enlarged head formed of a relatively high density beta shutter material and in which said target material portion is received on an upper surface of said head.

8. An improved nucleonic gauge system for measuring the thickness of tissue material including a source head and a detector head spaced from said source head defining a pass gap therebetween comprising a source head body having means therein defining an annular cavity, said cavity opening at one side of said body into an axial emission aperture, an annular source of radioactive beta-emitting material received in said body inwardly of said aperture, means in said body defining target material positioned inwardly of said source and arranged to direct modified beta energy from said source through said aperture into the pass gap.

9. The apparatus of claim 8 in which said source is defined with an axial opening therethrough at least as large as that of said aperture, and a shutter having a portion movable axially through said source opening and into closing relation with said aperture.

10. The gauge of claim 9 in which said shutter is movable to a retracted position exposing said aperture and in said retracted position has a surface exposed to radiation from said source which surface defines at least a portion of said target material.

* * * * *